(12) United States Patent
Zhu et al.

(10) Patent No.: US 11,140,839 B2
(45) Date of Patent: Oct. 12, 2021

(54) METHOD FOR CALCULATING DEPTH OF SPRAYED WATER OF TRANSLATIONAL SPRINKLER IN DIFFERENT WORKING CONDITIONS

(71) Applicant: Jiangsu University, Jiangsu (CN)

(72) Inventors: Xingye Zhu, Jiangsu (CN); Shouqi Yuan, Jiangsu (CN); Junping Liu, Jiangsu (CN); Jinghong Wan, Jiangsu (CN); Kun Tian, Jiangsu (CN)

(73) Assignee: Jiangsu University, Jiangsu (CN)

( * ) Notice: Subject to any disclaimer, the term of this patent is extended or adjusted under 35 U.S.C. 154(b) by 223 days.

(21) Appl. No.: 16/343,967

(22) PCT Filed: Nov. 22, 2016

(86) PCT No.: PCT/CN2016/106704
§ 371 (c)(1),
(2) Date: Apr. 22, 2019

(87) PCT Pub. No.: WO2018/082128
PCT Pub. Date: May 11, 2018

(65) Prior Publication Data
US 2019/0269077 A1  Sep. 5, 2019

(30) Foreign Application Priority Data

Nov. 1, 2016 (CN) .......................... 201610940702.7

(51) Int. Cl.
*A01G 25/16* (2006.01)
*G06Q 50/02* (2012.01)
(Continued)

(52) U.S. Cl.
CPC .............. *A01G 25/16* (2013.01); *B05B 1/169* (2013.01); *B05B 1/1654* (2013.01); *G16Z 99/00* (2019.02); *G06Q 50/02* (2013.01)

(58) Field of Classification Search
CPC ...... A01G 25/16; G16Z 99/00; B05B 1/1654; B05B 1/169; B05B 13/041; G06Q 50/02
(Continued)

(56) References Cited

FOREIGN PATENT DOCUMENTS

| CN | 1908615 A | 2/2007 |
| CN | 1028654546 A | 1/2013 |
| CN | 104268313 A | 1/2015 |

OTHER PUBLICATIONS

Haijun et al., "Characterizing center pivot irrigation with fixed spray plate sprinklers", 2010, Science China Technological Sciences 53.5, pp. 1398-1405.*

(Continued)

*Primary Examiner* — Juan C Ochoa
(74) *Attorney, Agent, or Firm* — Greenberg Traurig, LLP

(57) ABSTRACT

Disclosed is a method for calculating the depth of sprayed water of a translational sprinkler in different working conditions, involving placing rain barrels (3) in n rows in the movement direction of a translational sprinkler (1), each row having m barrels, such that the spray radius of rain droplets can completely cover the rain barrels (3) while ensuring that the translational sprinkler (1) is spraying stably; calculating the average sprinkler strength of each rain barrel (3); drawing a relationship curve of the sprinkler strength and the distance from the centre; setting the movement speed s of the translational sprinkler (1); establishing a function relationship between a sprinkler strength d' and time t; calculating the time t2 needed for the translational sprinkler (1) to completely pass one of the rain barrels (3); and with the condition that the movement time is t2, performing mathematical integration on the sprinkler strength function to obtain the sprinkled depth of water at a certain rain barrel
(Continued)

(3). The calculation method has a simple operation, is fast and can effectively save on costs, providing a basis for optimizing the movement speed of the translational sprinkler (1).

5 Claims, 2 Drawing Sheets

(51) Int. Cl.
 *B05B 1/16* (2006.01)
 *G16Z 99/00* (2019.01)

(58) Field of Classification Search
 USPC .............................................................. 703/2
 See application file for complete search history.

(56) References Cited

OTHER PUBLICATIONS

King and Bjomeberg, Center pivot simulator for evaluating system design and management effects on infiltration and erosion, 2007, pp. 166-175.*

Plaán et al., "Characterizing pivot sprinklers using an experimental irrigation machine", 2004, Agricultural water management 70.3, pp. 177-193.*

Clark et al., "Measured and simulated uniformity of low drift nozzle sprinklers", 2003, Transactions of the ASAE 46.2, pp. 321-330.*

Jing-Hong Wan et al., "Tranlocating Speed Ration Effect on Water Distribution Uniformity of Lightweight Lateral Move Irrigation System", Water Saving Irrigation, pp. 87-93, Sep. 2016.

Zhu et al., "Comparison of fluidic and impact sprinklers based on hydraulic performance," Irrig Sci (2015) 33:367-374.

* cited by examiner

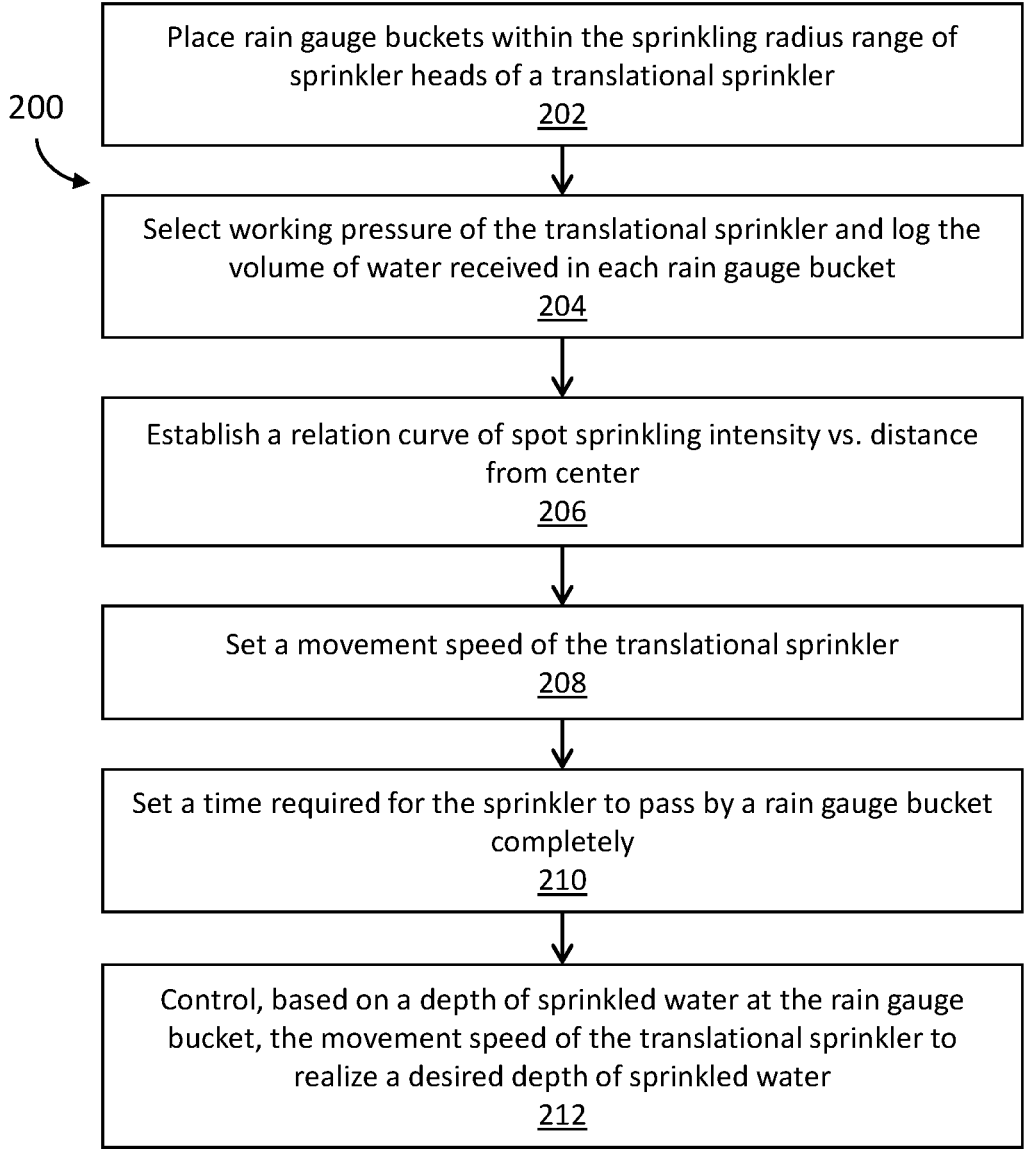

METHOD FOR CALCULATING DEPTH OF SPRAYED WATER OF TRANSLATIONAL SPRINKLER IN DIFFERENT WORKING CONDITIONS

CROSS REFERENCE TO RELATED APPLICATION

The present application is a 371 U.S. National Stage of International Application No. PCT/CN2016/106704, filed Mar. 22, 2016, which claims the benefit of the earlier filing date of Chinese Patent Application No. 201610940702.7 filed on Nov. 1, 2016, which are each incorporated herein by reference in their entirety.

I. TECHNICAL FIELD

The present invention relates to the technical field of automatic sprinkling irrigation, particularly to a method for calculating the depth of water sprinkled of a translational sprinkler in different working conditions.

II. BACKGROUND ART

Small-scale translational sprinklers are of a unique model in China, and have a characteristic of stable operation. Sprinkling intensity is an important index for evaluating a sprinkler irrigation system. The value of the sprinkling intensity shall not exceed the allowable sprinkling intensity of the soil. However, the sprinkling intensity of the unit can be changed when the volume of sprinkled water or travel speed of the unit is changed. The movement speed of the sprinkler determines the primary sprinkling depth. The precipitation depth is maximum when the movement speed of the sprinkler is minimum, provided that the sprinkling depth is slightly greater than the infiltration speed in the soil. Impounded surface water and runoff, etc. may be resulted from excessive precipitation depth in unit time, and consequently the soil structure may be damaged, adverse to soil conservation and fertilizer maintenance; a water drift phenomenon may occur if the precipitation depth is not enough, and consequently the sprinkling irrigation efficiency may be degraded and the cost may be increased. To avoid the above problems and realize reasonable sprinkling irrigation, it is necessary to make research on the relationship between movement speed of sprinkler and the depth of sprinkling irrigation. Such a research is helpful for studying technical indexes such as the law of water distribution, hitting kinetic energy and irrigation efficiency, etc. Besides, such a research is of certain theoretical and practical significance for the research on water and soil conservation. Therefore, it is of great significance to develop a method for calculating the depth of water sprinkled of a translational sprinkler in different working conditions.

III. CONTENTS OF THE INVENTION

The object of the present invention is to provide a method for calculating the depth of water sprinkled of a small-scale translational sprinkler in different working conditions, in order to solve the problem for controlling travel speed of a translational sprinkler, to realize reasonable sprinkling irrigation and reduce cost.

To attain the above-mentioned object, the present invention provides a method for calculating the depth of water sprinkled of a translational sprinkler in different working conditions, which comprises the following steps:

a) placing rain gauge buckets with water-receiving opening in diameter D in n rows and m columns, at spacing a between the rows and between the columns, within the sprinkling range of sprinkler heads in the travel direction of the sprinkler, to collect sprinkled water droplets;

b) selecting an working pressure of the translational sprinkler, to maintain the translational sprinkler in a state of stable sprinkling at fixed spots, and logging the volume of water droplets $c_\xi$ received in each rain gauge bucket within sprinkling time $t_1$, wherein $\xi=1, 2, 3, \ldots, m \times n$, calculating average volume of water droplets $c_j = c_\xi/m$ received in the rain gauge buckets in each row, wherein $i=1, \ldots, n$, repeating the above-mentioned process for b times, calculating average volume of water droplets $v_i = \Sigma_{j=1}^{b} c_{ij}/b$ received in the rain gauge buckets in each row, wherein $i=1, 2, 3, \ldots, n$, $j=1, 2, 3, \ldots, n$, and calculating spot sprinkling intensity $$di = v_i \bigg/ \left[\pi \cdot \left(\frac{D}{2}\right)^2 \cdot t_1\right],$$

wherein $i=1, 2, \ldots, n$;

c) establishing a relation curve of spot sprinkling intensity vs. distance from center: numbering the rain gauge buckets by the sequence of passing of the translational sprinkler as rain gauge bucket 1, rain gauge bucket 2, rain gauge bucket 3, . . . , rain gauge bucket n−1, and rain gauge bucket n, and plotting a relation curve of sprinkling intensity vs. distance from the sprinkler head at the center, with the sprinkler head at the center as an origin, the distance of rain gauge bucket from the sprinkler head as x-axis, and the sprinkling intensity of sprinkler head as y-axis, and establishing a functional relationship $d=f(L)$;

d) setting a movement speed s of the unit, establishing a mathematical curve of $d'=f(t)$ according to $L=st$, and converting the relation curve of sprinkling intensity vs. distance from the sprinkler head at the center into a relation curve of sprinkling intensity vs. time t;

e) setting the time required for the sprinkler to pass by a rain gauge bucket completely as $t_2$, calculating the depth of sprinkled water $$H' = \int_0^{t_2} f(t)dt$$

collected after the sprinkler passes by the rain gauge bucket completely, which is the depth of sprinkled water at the rain gauge bucket in a travel cycle of the translational sprinkler.

Furthermore, when the relation curve of sprinkling intensity vs. distance from the sprinkler head at the center is plotted in the step c), only the positive half of x-axis is taken into consideration since the sprinkling area of the sprinkler head is circular and the negative part of x-axis is symmetric to the positive half of x-axis with respect to y-axis, and the depth of sprinkled water at a rain gauge bucket in a travel cycle of the translational sprinkler in the step e) is $$H = 2\int_0^{t_2} f(t)dt.$$

Furthermore, the number n of rows of the rain gauge buckets is greater than 1, and the number m of rain gauge buckets in each row is greater than 1.

Furthermore, the number b of repetition times of the test is greater than 1.

Furthermore, in the travel direction of the sprinkler, the sprinkling radius R of the sprinkler heads is about 3.6 m, the number of the sprinkler heads is 3, the mounting spacing between the 3 sprinkler heads is 3 m, the altitude of the sprinkler heads from the ground is 1 m, the diameter D of the water-receiving opening of the rain gauge bucket is 0.2 m, n=11, m=-9, and the spacing a between the rain gauge buckets is 0.3 m.

The method for calculating the depth of water sprinkled of a translational sprinkler in different working conditions provided in the present invention is simple and quick to operate, can effectively save cost, and provides a basis for optimization of the movement speed of a translational sprinkler.

IV. DESCRIPTION OF DRAWINGS

FIG. 2 is a flow diagram illustrating a method for controlling the movement and speed of a translational sprinkler in different working conditions.

Figure 1:
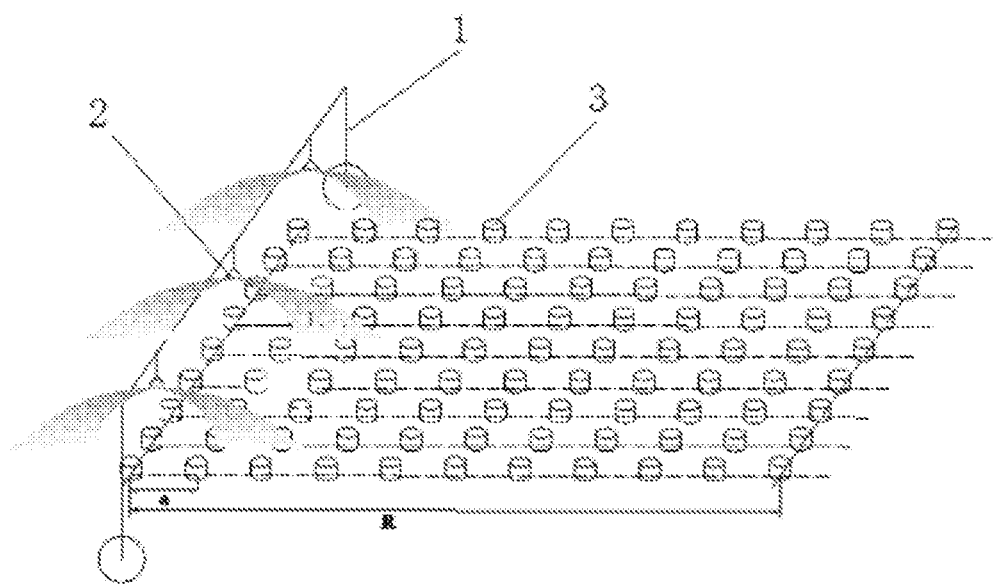
FIG. 1 is a schematic layout diagram of the rain gauge buckets for a translational sprinkler.

In the FIGURE:
1. translational sprinkler; 2—sprinkler head; 3—rain gauge bucket

V. EMBODIMENTS

Hereunder the present invention will be further detailed in embodiments with reference to the accompanying drawings, but the protection scope of the present invention is not limited to those embodiments.

To describe the method for calculating the depth of water sprinkled of a translational sprinkler in different working conditions provided in the present invention more clearly, a translational sprinkler 1 is selected as a test object, and the sprinkler heads used is a Nelson D3000 refraction sprinkler heads with sprinkling radius R of about 3.6 m, 3 sprinkler heads are mounted at 3 m spacing at 1 m height, and rain gauge buckets with water-receiving opening in diameter D=0.2 m are arranged in n rows and m columns at 0.3 m spacing from each other in the travel direction of the sprinkler for collecting sprinkled water droplets, wherein n=1 and m=9; the rain gauge buckets are fully covered by the water droplet sprinkling radius.

First, the working pressure for the test is set to 0.07 Mpa, and the timing is started after the translational sprinkler 1 sprinkles stably; after the translational sprinkler sprinkles for 15 min. at fixed spots, the volume of water droplets $c_\xi$ received by each rain gauge bucket 3 within the 15 min. sprinkling time at fixed spots is logged, wherein $\xi$=1, 2, 3, . . . , m×n. The average volume of water droplets $c_i = c_\xi/m$ received in the rain gauge buckets 3 in each row is calculated, wherein i=1, . . . , n. The test is repeated for 3 times under the same conditions, the average volume of water droplets $v_i = \Sigma_{j=1}^{b} c_{ij}/b$ received in the rain gauge bucket 3 is each row is calculated, wherein i=1, 2, 3, . . . , n, j=1, 2, 3, . . . , b, and the spot sprinkling intensity $$di = v_i \bigg/ \left[\pi \cdot \left(\frac{D}{2}\right)^2 \cdot t_1\right]$$

is calculated, wherein i=1, 2, . . . , n.

The average volume of water droplets received in the rain gauge buckets 3 in each row and the sprinkling intensity are shown in Table 1.

TABLE 1

Average Volume of Sprinkled Water Received in Each Rain Gauge Bucket and Sprinkling Intensity

| | | Row No. | | | | | | | | | | |
|---|---|---|---|---|---|---|---|---|---|---|---|
| | | 1 | 2 | 3 | 4 | 5 | 6 | 7 | 8 | 9 | 10 | 11 |
| Volume of Sprinkled Water, mL | 1st time | 354 | 150 | 180 | 194 | 283 | 351 | 366 | 385 | 384 | 175 | 40 |
| | 2nd time | 418 | 154 | 190 | 215 | 287 | 417 | 470 | 490 | 485 | 372 | 136 |
| | 3rd time | 370 | 146 | 185 | 194 | 283 | 390 | 453 | 522 | 520 | 355 | 110 |
| | Average value | 380 | 149.6 | 181.6 | 201 | 284.3 | 386 | 429.6 | 465.6 | 463 | 300.6 | 94.6 |
| Sprinkling Intensity (mm/h) | | 12.1 | 4.76 | 5.78 | 6.4 | 9.05 | 12.29 | 13.7 | 14.8 | 14.7 | 9.6 | 3.0 |

A relation curve of spot sprinkling intensity vs. distance from center is established: the rain gauge buckets are numbered by the sequence of passing of the translational sprinkler as rain gauge bucket 1, rain gauge bucket 2, rain gauge bucket 3, . . . , rain gauge bucket n−1, and rain gauge bucket n, and a relation curve of sprinkling intensity vs. distance from the sprinkler head at the center is plotted, with the sprinkler head at the center as an origin, the distance of rain gauge bucket from the sprinkler head as x-axis, and the sprinkling intensity of sprinkler head as y-axis, and a functional relationship d=f(L) is established. When the relation curve of sprinkling intensity vs. distance from the sprinkler head at the center is plotted in the step c), only the positive half of x-axis is taken into consideration since the sprinkling area of the sprinkler head is circular and the negative part of x-axis is symmetric to the positive half of x-axis with respect to y-axis. The distance of the first rain gauge bucket from the sprinkler head at the center of the translational sprinkler is 0.3 m, a rain gauge bucket is placed at 0.3 m interval, and curve fitting is carried out according to the measurement data, to obtain a mathematical functional relationship between the sprinkling intensity and the distance of the rain gauge bucket from the sprinkler head at the center:

$$d = -33.55x + 25.17x^2 - 4.91x^3 + 18.89$$

The movement speed s of the sprinkler unit is set to s=2 m/min., a mathematical curve of d'=f(t) is established according to L=st, and the relation curve of sprinkling intensity vs. distance from the sprinkler head at the center into a relation curve of sprinkling intensity vs. time t. The above-mentioned functional relationship may be simplified as:

$$d' = -67.1t + 100.68t^2 - 39.28t^3 + 18.89$$

The time required for the sprinkler to pass by a rain gauge bucket completely is $t_2 = 0.03$ h, the depth of sprinkled water $$H' = \int_0^{t_2} f(t)dt$$

collected after the sprinkler 1 passes by the rain gauge bucket 3 completely is calculated by integration according to the above-mentioned mathematical functional relationship y'. Since only the positive half of x-axis is taken into consideration, the depth of sprinkled water at a rain gauge bucket in a travel cycle of the translational sprinkler 1 is $$H = 2\int_0^{t_2} f(t)dt, \text{ i.e.:}$$

$$H = 2\int_0^{0.03} (-67.1t + 100.68t^2 - 39.28t^3 + 18.89)dt$$

Through the calculation, a result Q=1.07 mm is obtained, i.e., the depth of sprinkled water is 1.07 mm.

While above described embodiments are preferred embodiments of the present invention, the present invention is not limited to those above embodiments. Any obvious improvement, replacement, or variation that can be made by those skilled in the art without departing from the spirit of the present invention shall be deemed as falling in the protection scope of the present invention.

FIG. 2 is a flow diagram illustrating a method 200 for controlling the movement and speed of a translational sprinkler in different working conditions. The method 200 includes placing rain gauge buckets within a sprinkling radius range of sprinkler heads of a translational sprinkler at a step 202. The method 200 further includes selecting a working pressure of the translational sprinkler and logging the volume of water received in each rain gauge bucket at a step 204. The method 200 further includes establishing a relation curve of spot sprinkling intensity vs. distance from center at a step 206. The method 200 further includes setting a movement speed of the translational sprinkler at a step 208. The method 200 further includes setting a time required for the sprinkler to pass by a rain gauge bucket completely at a step 210. The method 200 further includes controlling, based on a depth of sprinkled water at the rain gauge bucket, the movement speed of the translational sprinkler to realize a desired depth of sprinkled water at a step 212.

We claim:

1. A method for controlling the movement and speed of a translational sprinkler in different working conditions comprising the following steps:
  a) placing rain gauge buckets with water-receiving opening in diameter D in n rows and m columns, at spacing a between the rows and between the columns, within the sprinkling radius range of sprinkler heads in the travel direction of the translational sprinkler, to collect sprinkled water droplets;
  b) selecting an working pressure of the translational sprinkler, to maintain the translational sprinkler in a state of stable sprinkling at fixed spots, and logging the volume of water droplets $c_\xi$ received in each rain gauge bucket within sprinkling time t1, wherein $\xi = 1, 2, 3, \ldots, m \times n$, calculating average volume of water droplets $c_i = c_\xi/m$ received in the rain gauge buckets in each row, wherein $i = 1, \ldots, n$, repeating the above-mentioned process for b times, calculating average volume of water droplets $v_i = \Sigma_{j=1}^{b} c_{ij}/b$ received in the rain gauge buckets in each row, wherein $i = 1, 2, 3, \ldots, n$, $j = 1, 2, 3, \ldots, n$, and calculating spot sprinkling intensity $$d_i = v_i \Big/ \Big[\pi \cdot \Big(\frac{D}{2}\Big) \cdot t_1\Big],$$

wherein $i = 1, 2, \ldots, n$;
  c) establishing a relation curve of spot sprinkling intensity vs. distance from center: numbering the rain gauge buckets by the sequence of passing of the translational sprinkler as rain gauge bucket 1, rain gauge bucket 2, rain gauge bucket 3, . . . , rain gauge bucket n−1, and rain gauge bucket n, and plotting a relation curve of sprinkling intensity vs. distance from a sprinkler head at a center of the sprinkler heads, with the sprinkler head at the center as an origin, the distance of rain gauge bucket from the sprinkler head as x-axis, and the sprinkling intensity of sprinkler head as y-axis, and establishing a functional relationship d=f(L), wherein d is the sprinkling intensity, and L is the vertical distance of the sprinkler head at a center of the rain gauge buckets;
  d) setting a movement speed s of the translational sprinkler, establishing a mathematical curve of d=f(t) according to L=st and wherein t is time, and converting the relation curve of sprinkling intensity vs. distance from the sprinkler head at the center into a relation curve of sprinkling intensity vs. time t;
  e) setting the time required for the translational sprinkler to pass by a rain gauge bucket completely as $t_2$, calculating a depth of sprinkled water $H = \int_0^{t_2} f(t)dt$ collected after the translational sprinkler passes by the rain gauge bucket completely, which is the depth of sprinkled water at the rain gauge bucket in a travel cycle of the translational sprinkler; and
  f) controlling, based on the depth of sprinkled water at the rain gauge bucket in the travel cycle of the translational sprinkler, the movement speed s of the translational sprinkler to realize a desired depth of sprinkled water for sprinkling irrigation.

2. The method for controlling the movement and speed of a translational sprinkler in different working conditions according to claim 1 wherein when the relation curve of sprinkling intensity vs. distance from the sprinkler head at the center is plotted in the step c), only the positive half of x-axis is taken into consideration since the sprinkling area of the sprinkler head is circular and the negative part of x-axis is symmetric to the positive half of x-axis with respect to y-axis, and the depth of sprinkled water at a rain gauge bucket in a travel cycle of the translational sprinkler in the step e) is $H=2\int_0^{r_2} f(t)dt$.

3. The method for controlling the movement and speed of a translational sprinkler in different working conditions according to claim 1 wherein the number n of rows of the rain gauge buckets is greater than 1, and the number m of rain gauge buckets in each row is greater than 1.

4. The method for controlling the movement and speed of a translational sprinkler in different working conditions according to claim 1 wherein the number b of repetition times is greater than 1.

5. The method for controlling the movement and speed of a translational sprinkler in different working conditions according to claim 1 wherein in the travel direction of the translational sprinkler, the sprinkling radius R of the sprinkler heads is 3.6 m, the number of the sprinkler heads is 3, the mounting spacing between the 3 sprinkler heads is 3 m, the altitude of the sprinkler heads from the ground is 1 m, the diameter D of the water-receiving opening of the rain gauge bucket is 0.2 m, n=11, m=9, and the spacing a between the rain gauge buckets is 0.3 m.

* * * * *